US012754761B1

(12) United States Patent
Chang et al.

(10) Patent No.: US 12,754,761 B1
(45) Date of Patent: Oct. 6, 2026

(54) WORKFLOW ORCHESTRATION BASED ON IDEMPOTENT ACTIVITIES AND READ-ONLY ACTIVITIES

(71) Applicant: STRIPE, LLC, South San Francisco, CA (US)

(72) Inventors: Alexander Chang, Columbia, MD (US); Hai Wang, Seattle, WA (US); Mark Vandevoorde, Los Altos, CA (US); Kevin McCluskey, Carlsbad, CA (US)

(73) Assignee: STRIPE, LLC, South San Francisco, CA (US)

( * ) Notice: Subject to any disclaimer, the term of this patent is extended or adjusted under 35 U.S.C. 154(b) by 625 days.

(21) Appl. No.: 18/124,542

(22) Filed: Mar. 21, 2023

Related U.S. Application Data

(60) Provisional application No. 63/322,148, filed on Mar. 21, 2022.

(51) Int. Cl.
*G06F 9/48* (2006.01)

(52) U.S. Cl.
CPC .................................... *G06F 9/485* (2013.01)

(58) Field of Classification Search
CPC ...................................................... G06F 9/485
USPC .......................................................... 718/108
See application file for complete search history.

(56) References Cited

U.S. PATENT DOCUMENTS

| | | | | |
|---|---|---|---|---|
| 9,952,896 | B2 * | 4/2018 | Wagner | G06F 9/52 |
| 2008/0270477 | A1 * | 10/2008 | Starkey | G06Q 10/103 |
| 2016/0224571 | A1 * | 8/2016 | Rosseel | G06F 3/0484 |
| 2017/0351488 | A1 * | 12/2017 | Hinds | G06F 7/48 |
| 2018/0239636 | A1 * | 8/2018 | Arora | G06F 9/485 |
| 2021/0065120 | A1 * | 3/2021 | De Munck | G06F 16/29 |
| 2021/0200533 | A1 * | 7/2021 | Gage | G06F 8/71 |
| 2023/0112050 | A1 * | 4/2023 | Askeland | G07C 5/085 701/27 |

* cited by examiner

*Primary Examiner* — Pierre Vital
*Assistant Examiner* — Daniel Trainor
(74) *Attorney, Agent, or Firm* — Finnegan, Henderson, Farabow, Garrett & Dunner, LLC

(57) ABSTRACT

A method includes: receiving an initial input message from a caller to a processing system configured to receive input messages and to generate output messages in response to the input message and a persistent store; identifying a workflow associated with the initial input message, the workflow including activities, each activity being separately classified as an idempotent read-write activity, an idempotent read-only activity, or a non-idempotent read-only activity associated with a corresponding service of the processing system; and executing the workflow by supplying the initial input message to the workflow and, for each activity: in response to determining that an input message to the activity includes non-reproducible data, storing the non-reproducible data in the persistent store only if the input message includes non-reproducible data and the activity is a read-write activity or a return to the caller; and providing the input message to a service corresponding to the activity.

20 Claims, 11 Drawing Sheets

WORKFLOW ORCHESTRATION BASED ON IDEMPOTENT ACTIVITIES AND READ-ONLY ACTIVITIES

CROSS-REFERENCE TO RELATED APPLICATION(S)

This application claims the benefit of U.S. Provisional Patent Application No. 63/322,148, filed in the United States Patent and Trademark Office on Mar. 21, 2022, the entire disclosure of which is incorporated by reference herein.

FIELD

Aspects of embodiments of the present disclosure relate to orchestration of workflows in service oriented architectures.

BACKGROUND

In the context of software engineering, a software system having a service oriented architecture (SOA) includes multiple separate, self-contained software services (or actors or agents) that provide functionality to one another through corresponding application programming interfaces (APIs). Generally, services communicate with one another by sending messages to one another. Upon receiving a message, a service may generate one or more additional messages that are sent to other parties (e.g., other services or consumers) and/or reply to the party that sent the incoming message. Any given service in the system may be composed of multiple services. In addition, consumers such as client user devices and logging systems or producers such as data sources may send messages to a service and/or receive responses from services without automatically generating messages in response. The party sending a message to a service may be referred to as a caller (e.g., in the sense of calling a function).

Multiple services can be combined together to form a workflow. For example, an incoming message to transfer funds from a first account to a second account may send a first message to a debiting service to remove funds from the first account and a second message to a crediting service to add the funds to the second account. Other services may also be triggered during this process to perform other functionality, such as generating reports for audits.

The above information disclosed in this Background section is only for enhancement of understanding of the present disclosure, and therefore it may contain information that does not form the prior art that is already known to a person of ordinary skill in the art.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present disclosure relate to a software system having a service-oriented architecture (SOA) that provides for recovery in the event of failure of one or more services within the system, high throughput, and low latency. Some aspects of embodiments relate to constraining the activities of the services in the system to idempotent activities and read-only activities.

In a computer processing system having a service oriented architecture (SOA), multiple separate, self-contained software services provide specific activities having specified outcomes. A service receives incoming messages via an associated interface (e.g., an application programming interface or API) and may generate one or more messages in response to the message. The receiving of a message may also be considered to be a remote procedure call (RPC), where the sender of the message is the caller of an RPC and the data format of the message may reflect the application programming interface of the remote procedure. Messages may be represented a structured data format such as JavaScript Object Notation (JSON), WebPack, ProtoBuf, or Extensible Markup Language (XML) format such as Simple Object Access Protocol (SOAP), or may be represented in a proprietary data format. A service may be composed of other underlying services.

Figure 1A:
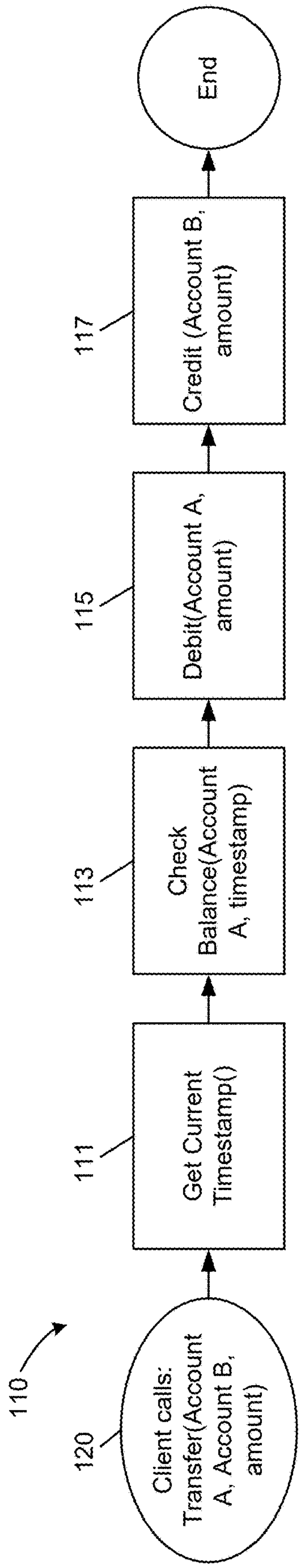
FIG. 1A is an example of a service having a workflow to be orchestrated in accordance with embodiments of the present disclosure.

As a motivating example, FIG. 1A is an example of a service having a workflow to be orchestrated in accordance with embodiments of the present disclosure.

FIG. 1A shows an example of a Transfer service 110 for transferring funds between two accounts, labeled Account A and Account B. The Transfer service 110 is composed of multiple services, including a current timestamp service 111, a check balance service 113, a debit service 115, and a credit service 117. An initial input message 120 from a client (e.g., a web application or other user-facing service configured to receive requests from users) calls the Transfer service 110 with various arguments, including an identification of the account that funds will be transferred from (Account 'A'), an account that the funds will be transferred to (Account 'B'), and an amount to be transferred.

The particular composition of multiple services within the Transfer service 110 as shown in FIG. 1A may be referred to as a workflow. In the particular example of FIG. 1A, the workflow includes activities of getting the current timestamp (using the corresponding Get Current Timestamp service 111), checking that Account A has a sufficient balance (using the Check Balance service 113), debiting the specified amount from Account A (using the Debit service 115), and crediting the specified amount to Account B. Other services may make use of services that are also used by the Transfer service 110. For example, many other services may use the Get Current Timestamp service 111 to generate a timestamp for a transaction or may use the Check Balance service 113 to obtain the current balance on an account in order to generate a report or populate a user interface with account information.

Because each service is separate and self-contained, it is possible for some services to fail while others are still operational. Activities within a workflow wrap non-deterministic code (e.g., code that can fail). Services may fail to produce the specified outcome for various reasons that may be general to the architecture or specific to the nature of the service. For example, failures may be caused by problems in the hardware or software infrastructure of the processing system such as software crashes, hardware failures, memory corruption errors, database corruption failures, failures of specific underlying services, planned or unplanned hardware downtime, network failures (e.g., hardware connections and/or routing failures), and the like. Service specific failures may include problems such as an attempt to debit an account that has zero balance or negative balance, an attempt to credit a non-existent account, an attempt to transfer an invalid amount of money, or the like.

Various activities of a workflow may be referred to being "idempotent" or "non-idempotent." An idempotent activity is one in which multiple calls (or messages) to the same service with the same arguments do not result in changes beyond any changes that may have occurred after the first call to the service. For example, a call to the Check Balance service 113 with an account identifier and a timestamp will return the balance of the given account at the time of the given timestamp. An activity that called the Check Balance service 113 may be considered to be idempotent if subsequent calls to the service also return the same balance value (which may be expected given the fixed timestamp). In contrast, a call to a Get Current Timestamp service 111 likely would not be idempotent, because the response from the Get Current Timestamp service 111 would change based on the current time (e.g., subsequent call would be expected to give later timestamps than previous calls).

Activities may also be referred to as being read-only activities or read-write activities (or, alternatively, write activities). A read-write activity or write activity results in adding to or modifying primary data in the processing system. For example, a Debit service responding to a read-write activity may add a new row to a database representing a particular Debit event, where the new row may identify the account that was debited, the amount of the debit, a transaction identifier, and a timestamp of the event. The Debit service may also update an existing row of a database that stores a current balance on the identified account by subtracting the specified amount from the value stored in that existing row.

In contrast, a read-only activity does not cause the service to modify data or add data to persistent store (e.g., modifying or adding entries to a database). (In some cases, a read-only activity may result in the writing of metadata such as adding to a log of all read-only calls made to the service. However, these activities will still be referred to herein as read-only activities because the underlying primary data is not modified by the read-only activity.)

Read activities and read-write activities may be idempotent or non-idempotent. As noted above, a call to the Get Current Timestamp service 111 is generally non-idempotent because the value returned by the service depends on the timing of the call. This call is also read-only because the Get Current Timestamp service 111 does not need to update any values in response to receiving such a call or message.

Calling the Check Balance service 113 is a read-only activity because it does not modify the balance on the account. If the Check Balance service 113 is called with only an account identifier, the activity may be non-idempotent because subsequent calls may return different results (e.g., if the balance on the account changed between different calls). However, by adding additional information to the call, such as a timestamp (specifying that the caller is requesting the balance on the account at the given timestamp) or an idempotency key (e.g., a fixed identifier associated with the particular call), the activity of checking the balance on an account can be made into an idempotent read-only activity.

Likewise, a read-write activity or write activity may typically be non-idempotent. For example, multiple calls to a Debit service that provide only an account identifier and an amount may cause the account to be debited multiple times by the specified amount. On the other hand, a read-write activity or write activity can be made into an idempotent activity by adding an identifier such as an idempotency key and by configuring the service to maintain record of previously handled idempotency keys. Upon receiving a read-write message or write message that includes an idempotency key, a service can determine whether the idempotency key appears in that record. If so, then the write was previously handled and no further write needs to be made. On the other hand, if the idempotency key does not appear in the record, the service can add that key to its record and perform a write (e.g., debiting the account) accordingly.

Figure 1B:
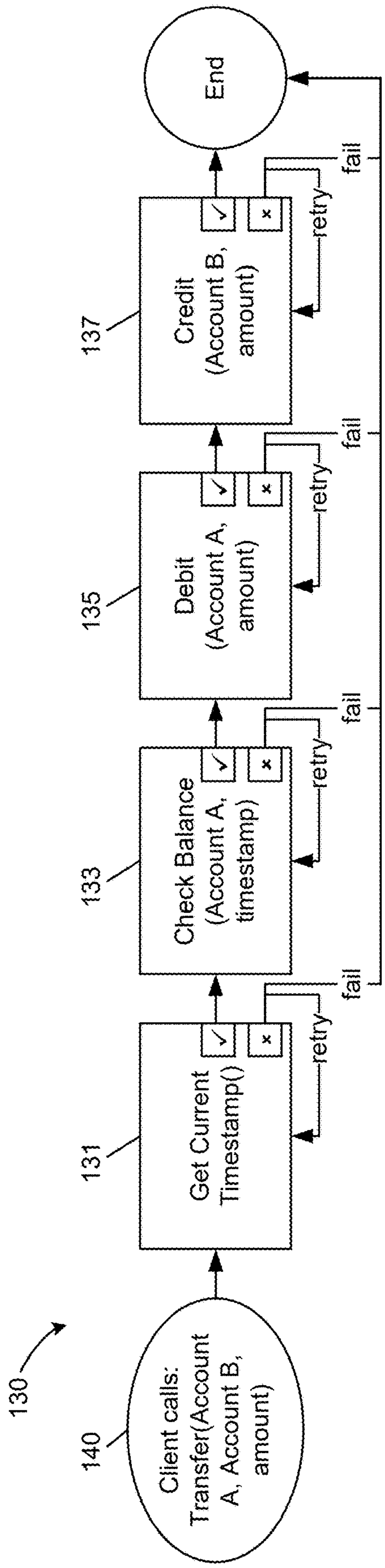
FIG. 1B is an example of a service having a workflow with non-deterministic code wrapped as activities that may fail, where the workflow may be orchestrated in accordance with embodiments of the present disclosure.

FIG. 1B is an example of a service having a workflow with non-deterministic code wrapped as activities that may fail, where the workflow may be orchestrated in accordance with embodiments of the present disclosure.

In the specific example of a Transfer service such as that shown in FIG. 1B, any particular execution of a particular service may succeed (as indicated in FIG. 1B by the check mark) or fail (as indicated in FIG. 1B by the cross mark). When an execution succeeds, the workflow proceeds to the next service (e.g., by sending an appropriate message to the service corresponding to the next activity in the workflow). However, when an execution fails, the execution may be retried (and may be done so safely, so long as the activities are idempotent), such as by retrying the call to the service (e.g., resubmitting the same input message to the service). Retries may be performed based on various timings, such as linear or capped exponential backoff (e.g., waiting longer periods between retries). If execution continues to fail (e.g., after a specified number of retries have been attempted), then the activity may fail and the execution of the workflow ends (e.g., following the "fail" paths shown in FIG. 1B). As shown in FIG. 1B, if any of the Get Current Timestamp service 131, the Check Balance service 133, the Debit service 135, or the Credit service 137 fails (after some number of retries), then the task ends in a failure.

However, if the activity to credit Account B using the Credit service 137 fails after successfully debiting Account A using the Debit service 135, then the money debited from Account A may be lost (or deleted), in the case of following the "fail" path out of Credit service 137. In financial accounting, it is typically desirable for the total amount of money in the system to be constant in order to keep the books balanced and to decrease risk during audits. Accordingly, this particular execution path produces undesirable results.

Therefore, some workflows include "compensation" or "rollback" or "undo" activities to restore conditions to the state before the start of the workflow and to maintain the invariant (e.g., to keep the books balanced).

Figure 1C:
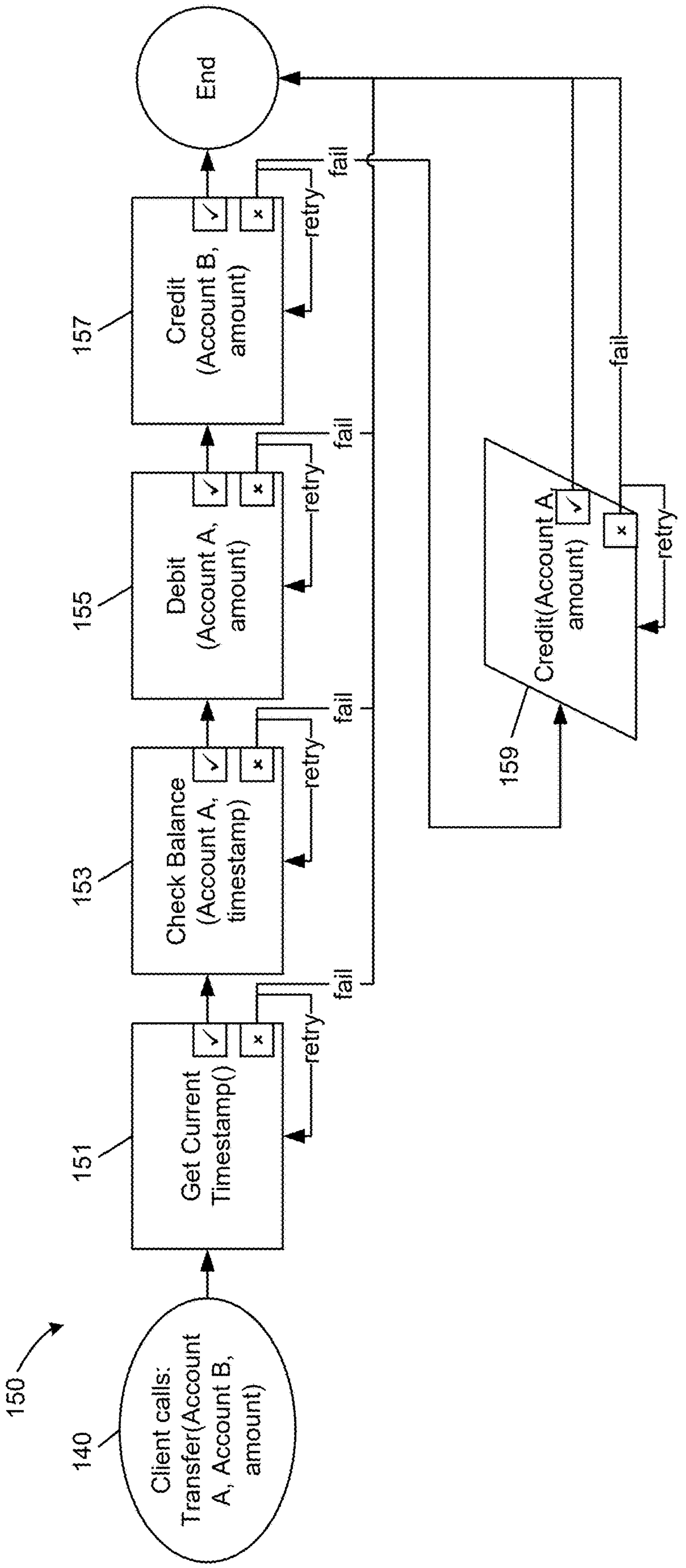
FIG. 1C is an example of a service having a workflow that includes a compensating activity to compensate for the failure of an activity in a workflow to be orchestrated in accordance with embodiments of the present disclosure.

FIG. 1C is an example of a service having a workflow that includes a compensating activity to compensate for the failure of an activity in a workflow to be orchestrated in accordance with embodiments of the present disclosure. As shown in FIG. 1C, if any of the Get Current Timestamp service 151, the Check Balance service 153, or the Debit service 155, fails (after some number of retries), then the workflow ends in a failure. This is not problematic because none of these failures results in a write. However, if the Debit service 155 succeeds and the Credit service 157 fails, then a debit event that was written should be undone or compensated for. Accordingly, a compensating Credit service 159 is used to compensate for the Debit (e.g., by crediting the debited amount back to Account A). If the compensating Credit activity succeeds, then the debit activity is properly reversed or undone, and the books remain balanced. However, the execution of the compensating Credit service 159 can also fail. Retrying the compensating Credit service 159 may eventually result in success, but there is still a possibility that the retries will be exhausted and the system will still be left in an inconsistent state (e.g., where a debit succeeded but no corresponding credit succeeded, thereby resulting in the loss of money).

Therefore, the present disclosure relates to providing a reliable service oriented architecture where aspects of the present disclosure include: remote procedure call (RPC) retries that can tolerate transient failures (e.g., temporary failures of services); mutating activities (writes) that are idempotent in order to tolerate potentially duplicated messages due to retries; the ability to back out of earlier operations if a later operation fails to restore invariants; and the ability to resume tasks in order to survive crashes.

In some embodiments, the above functionality is provided, in part, by a persistent store in the system (e.g., a database, a key value store, or the like) that stores information about the workflows being executed, where a given execution may be referred to herein as a task. The persistent store (or "task database") may store information such as the current state of a task as a checkpoint such that the task can be resumed later on and may also store information to determine whether an incoming message is being repeated (e.g., an idempotency key associated with a message in a task). In some embodiments, the persistent store further caches results produced by previous executions, thereby avoiding the expense of recomputing values.

One approach in such a system is to update the persistent store between activities as well as before the first activity and after the last activity. Accordingly, the messages passed in to each service at each activity of the workflow as well as the outputs produced by each service after completion of the activity can be saved to the persistent store. However, each save (or flush) to the persistent store must be performed synchronously in order to ensure that the data was written to the persistent store before proceeding, thereby introducing additional latency in the processing of the workflow.

Accordingly, aspects of embodiments of the present disclosure relate to systems and methods for storing state information of workflow execution (tasks) to enable resuming tasks in the case of transient failures, while reducing or minimizing latency in the typical case where all services are operating correctly. In some empirical testing, a comparative system executes workflows with latency on the order of hundreds of milliseconds while embodiments of the present disclosure execute equivalent workflows with latency on the order of tens of milliseconds, thereby showing approximately an order of magnitude reduction in latency.

Some aspects relate to reducing the latency by selectively performing writes to the persistent store (the task database) only under specified conditions, while omitting or skipping over such writes under other conditions. This avoids incurring the latency cost of the additional write in circumstances where it the write is unnecessary. Additional aspects of embodiments relate to implementation of the workflow orchestration features as a library that is called by the services themselves (e.g., by the computing devices executing the individual services) rather than by a centralized workflow orchestration service. This removes a layer of indirection between the persistent store and the services, thereby further reducing the latency of saving the state of execution to the persistent store. These features, among others, will be described in more detail below.

Figure 2:
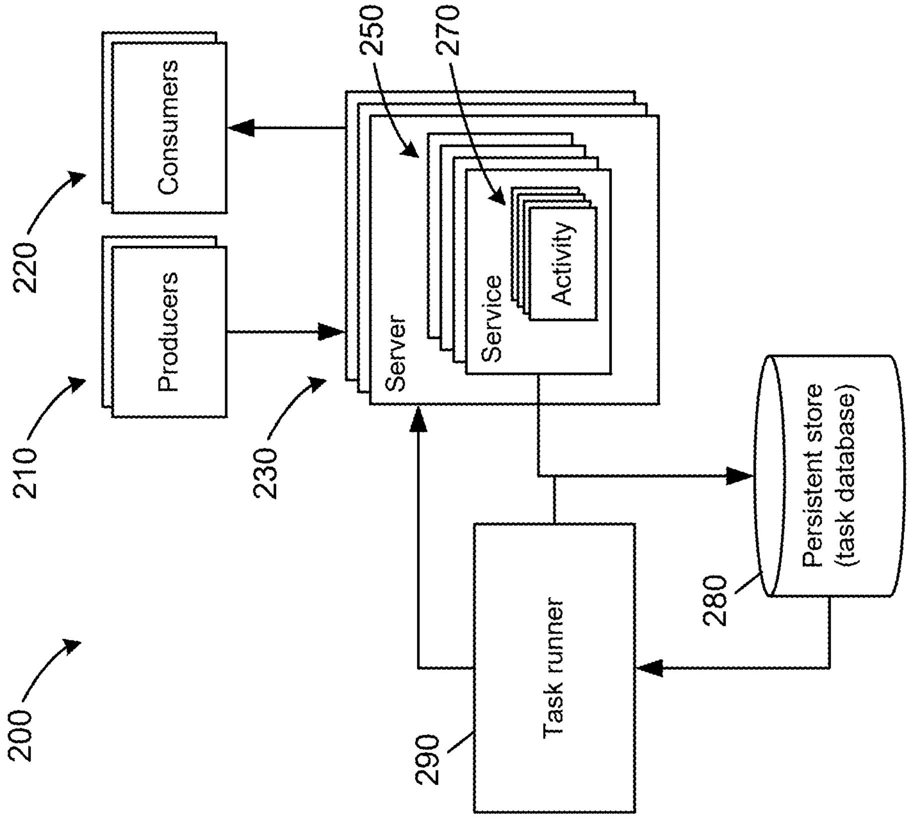
FIG. 2 is a block diagram depicting a workflow orchestration system according to one embodiment of the present disclosure.

FIG. 2 is a block diagram depicting a processing system 200 according to one embodiment of the present disclosure. As shown in FIG. 2, producers 210 (e.g., clients computing devices) and consumers 220 (e.g., data sinks such as logging systems or services outside of the processing system, such as other message processing systems operated by other entities and client computing receiving results) communicate with one or more servers 230 of the processing system 200, such as by sending messages to the servers 230 of the processing system. Each of the servers 230 may execute one or more services 250, where the services 250 expose application programming interfaces (APIs) for interacting with the producers 210 and consumers 220 and/or other services 250. For example, the APIs may specify the format of incoming messages and the expected defined behavior of the service in response to the message. As noted above, a given service may be associated with a workflow that includes one or more activities 270, where each activity may call another service or perform some action within the service (e.g., without making a remote call or sending a message to another service). A caller computing device initiates a task by providing an initial input message to the processing system 200, which identifies a corresponding workflow and orchestrates the execution of activities of the workflow, including generating messages and propagating messages through the services associated with the activities of the workflow. After completion of the workflow, a service may return a message to the caller (e.g., the source of the initial input message that started the workflow, such as another service 250 or a producer 210 or consumer 220).

At various points during the execution of the workflow, a service 250 executing a workflow may write data to a persistent store 280 (or task database), where the persistent store may be implemented by, for example, a relational database or RDBMS (e.g., a PostgreSQL, MySQL, Microsoft® SQL Server, Oracle® Database, and the like), a noSQL database (e.g., a document store such as MongoDB®, Amazon® DocumentDB, a key-value store such as Redis® or Memcached, or the like).

In various embodiments, the services 250 are implemented by program instructions stored in the memories of the servers 230 and executed by one or more processors (e.g., central processing units (CPUs), graphics processing units (GPUs), specialized accelerators such as artificial intelligence accelerators, field programmable gate arrays (FPGAs), application specific integrated circuits (ASICs), and the like), to perform various functions associated with the workflows implemented by the services. The program instructions (or application software instructions) implementing the services 250 executed by the servers 230 may be executed directly on the underlying processing circuit hardware (e.g., "bare metal") or may be executed within a virtual machine (VM), within a container, or the like, without limitation to particular implementation details. Examples of processing circuit hardware, virtual machines, containers will be described in more detail below with respect to FIGS. 8-10.

Some embodiments further include a task runner 290 to manage the execution of tasks (e.g., the execution of particular instances of workflows in response to particular input messages received from producers 210). The task runner 290 may be implemented as a software application or software service running on a server (e.g., the servers 230), such as the case of program instructions stored in memory of a server and executed by a processor of the server to perform the operations associated with a task runner as described herein. In some embodiments, the role of the task runner 290 is limited to the resumption of tasks that are stalled or paused (e.g., due to temporary failure of one or more services), as described in more detail below. In some embodiments, the task runner 290 may operate as an intermediary module or message middleware (e.g., a message broker) that receives all messages including messages from producers 210 and messages generated by services 250 and that manages the distribution of the messages to consumers 220 and services 250. As such, the task runner 290 in these embodiments acts as a centralized workflow coordinator that manages the execution of the workflows (tasks) by directing messages to the appropriate services in accordance with the order of the activities in the workflows.

In the embodiment shown in FIG. 2, services 250 are illustrated as performing writes directly to the persistent store 280. However, embodiments of the present disclosure are not limited thereto. For example, in some embodiments, the execution of a workflow is centrally managed by the task runner 290, which receives the messages produced by the services 250, performs writes to the persistent store 280 as necessary, and forwards messages to other services 250 and/or consumers 220 accordingly.

Figure 3:
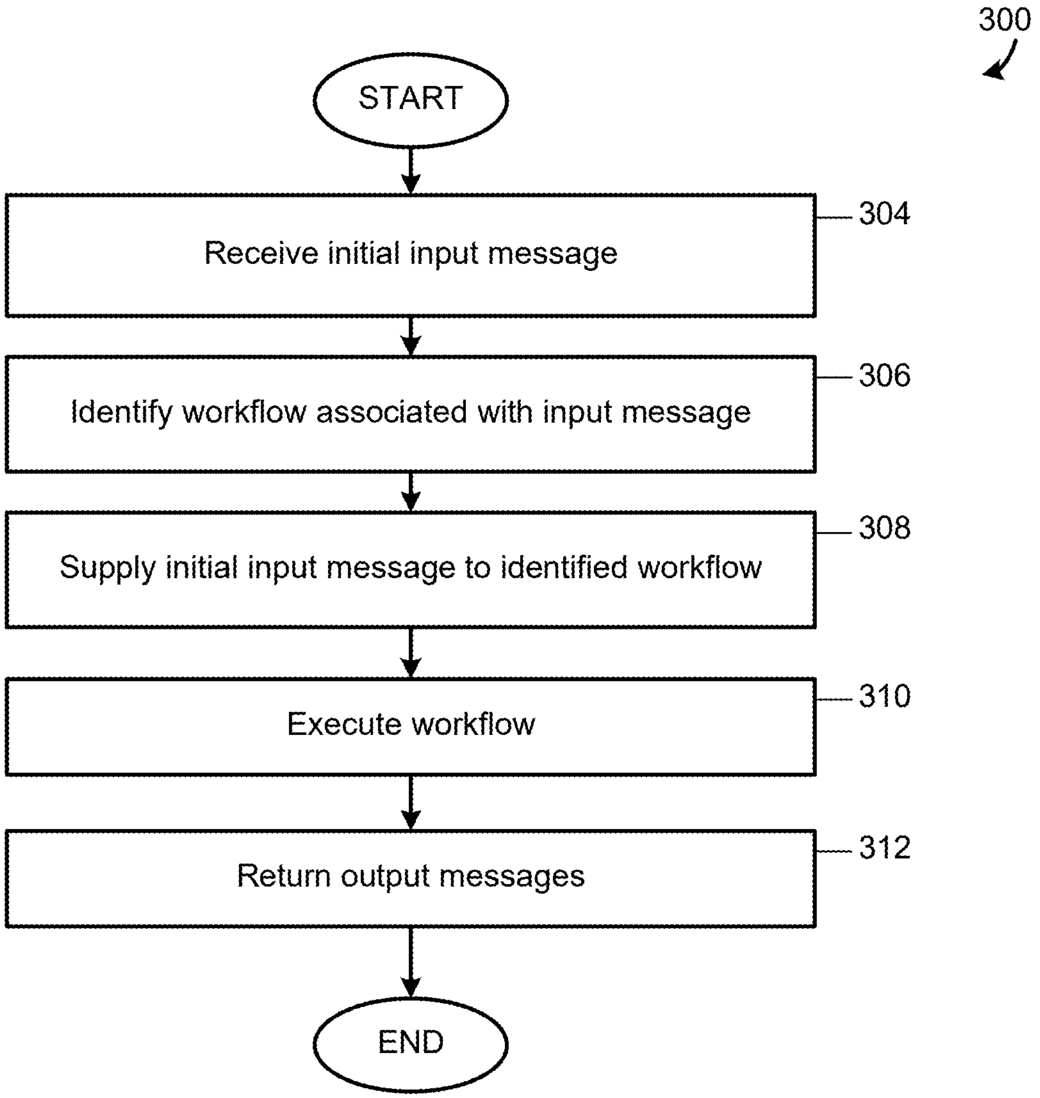
FIG. 3 is a flowchart depicting a method for executing a workflow according to one embodiment of the present disclosure.

FIG. 3 is a flowchart depicting a method 300 for executing a workflow according to one embodiment of the present disclosure. As noted above, in some embodiments of the present disclosure, the task runner 290 or other centralized workflow coordinator manages the execution of workflows or tasks and therefore the method 300 may be performed by the task runner 290. In other embodiments of the present disclosure, the management of the execution of the workflow or task is distributed within the processing system 200, such as being distributed among different services which coordinate the workflow by receiving messages, generating messages in response, and sending the generated messages to the appropriate next services in the workflow in accordance with the activities of the workflow. Accordingly, the operations of method 300 will be described herein as being performed by the processing system 200, where the specific operations are performed by the task runner 290 in some embodiments, by the services 250 in other embodiments, and by combinations thereof in still other embodiments.

Referring to FIG. 3, at 304, the processing system 200 receives an initial input message from a caller computing device (or "caller"). In some circumstances, the caller is another service 250 within the processing system 200, such as where a service 250 is the composition of multiple other services 250. In some circumstances, the caller is a producer 210, such as a client computing device or external service (e.g., third party service) connected to the processing system 200. For example, a client application running on a smartphone may send an initial input message to the processing system 200 to perform a transfer of some specified funds from one account to another or may send an initial input message to request the current balance on a particular account. As another example, a service running on a computing device outside of the processing system 200 may communicate with the processing system to generate inputs that send initial input messages to the processing system 200.

At 306, the processing system 200 identifies a workflow associated with the input message. For example, the initial input message may identify a recipient service that the message is to be sent to or may identify the name of a workflow (e.g., a Transfer workflow of a Transfer service) to be executed.

The example workflow to transfer funds between accounts as shown in FIG. 1A may be represented in pseudocode as shown below in Table 1:

TABLE 1

```
TransferResponse transfer(MyRequest request) {
   AResp aResp = getCurrentTimestamp( ); // non-idempotent, read-only
   BResp bResp = checkBalance(request.acctA, aResp); // idempotent,
   read-only
   if (balanceA > request.amount) {
      CResp cResp = debit(bResp, request.acctA, request.amount);
// idempotent, mutates
      DResp dResp = credit(cResp, request.acctB, request.amount);
// idempotent, mutates
      return dResp;
   }
   else {
      throw Exception("insufficient funds in " + request.acctA);
   }
}
```

In the above example, the request argument to the transfer( ) service is assumed to include at least the fields "acctA" (an identifier for Account A), "acctB" (an identifier for Account B), and "amount" (representing the amount of money to be transferred from Account A to Account B).

At 308, the processing system 200 supplies the initial input message to the identified workflow, such as by supplying the initial input message to the service associated with the first activity of the workflow. In some embodiments, the processing system 200 transforms the initial input message prior to sending the message to the service associated with the first activity, such as by converting the message to a different format or adding data fields to the message. In some embodiments, the processing system 200 assigns a unique identifier to each task (a task identifier such as an idempotency key associated with the task'yixppyixuQTqt), that is, in association with a particular execution of a workflow in response to a particular initial input message.

At 310, the processing system 200 executes the workflow, including supplying messages to the activities specified in the workflow and sending messages generated by the activities to other activities as specified in the workflow. At 312, the processing system 200 returns any output messages generated by one or more terminal activities in the workflow, such as by returning messages to the caller computing device.

As discussed above, during the execution of the workflow at 310, any of the services may fail, thereby potentially leaving the system in an inconsistent state (e.g., funds debited from one account without a corresponding credit to one or more other accounts or back to the same account) and checkpoints regarding the state of the execution of the workflow (or the state of the task) may be saved to persistent store such that the task can be resumed at a later time (e.g., by the task runner 290).

Data is "reproducible" if it is the result of an idempotent activity whole inputs are reproducible or if the data has been saved to persistent store (e.g., the persistent store 280) and can be retrieved from there when it is needed again. Otherwise, the data is non-reproducible. In other words, data is non-reproducible when the data is the result of a non-idempotent activity (or non-reproducible data was used to make the call to an idempotent activity) and where the data has not been written to persistent store.

In the example above, the input message ("request") is non-reproducible because it was received as input and has not been saved. The non-idempotent read-only call to the getCurrentTimestamp service generates non-reproducible data (represented in Table 1 as the return value aRsep). The call to checkBalance is idempotent read-only and therefore neither creates non-reproducible data or causes risks by storing non-reproducible data to external state (e.g., writing the non-reproducible data to external storage such as a database). Therefore, a crash at any point up until the call to the checkBalance service would mean that the caller of the transfer service would see a failure code that indicated a failure that could be safely retried, which is indistinguishable from a crash occurring earlier in the execution. Retrying this task with the given arguments ("request") is safe because the getCurrentTimestamp service is read-only and the checkBalance service is idempotent read-only.

However, the call to the debit service might write non-reproducible data to an external database. Therefore, to make this example implementation of a transfer service idempotent, the workflow can store the input ("request") and the non-reproducible data ("aResp") before calling the debit service. Thus, if a process crash of the debit service forces the processing system 200 to resume execution at a later time, the processing system 200 can reconstruct bResp and the remaining state of the task from the saved data because all subsequent calls are idempotent. However, it is difficult to determine, manually, when the state of a task in a checkpoint should be saved during the workflow and manually maintaining workflows with selective placement of writes to persistent store 280 (e.g., the task database) to save the non-reproducible data is error-prone.

Furthermore, supposing that the workflow should maintain an invariant that either the calls to the debit service and the credit service both succeed or neither's effects persist (e.g., such that the amount debited matches the amount credited). This means that if the execution of the call to the credit service fails, the processing system 200 undoes or compensates for the state changes made by the debit service. If other, earlier activities also performed mutations (e.g., writes) then those earlier activities would also need to be undone or compensated for. However, as noted above, the compensating activities may also fail, thereby still creating the possibility of the external data (e.g., data in databases) being left in an inconsistent state (e.g., mismatches in debits and credits between accounts).

Table 2 below shows pseudocode in which the state of the task is saved to the persistent store before and after each activity:

TABLE 2

```
TransferResponse transfer(MyRequest request) {
  saveTaskState(request) ;
  AResp aResp = getCurrentTimestamp( ); // non-idempotent, read-only
  saveTaskState (request, aResp);
  BResp bResp = checkBalance(request.acctA, ts); // idempotent,
  read-only
  saveTaskState (request, bResp);
  if (balanceA > request.amount) {
    CResp cResp = debit(bResp, request.acctA, request.amount);
// idempotent, mutates
    saveTaskState (request, cResp);
    DResp dResp = credit(cResp, request.acctB, request.amount);
// idempotent, mutates
    saveTaskState (request, dResp);
    return dResp;
  }
  else {
    throw Exception("insufficient funds in " + request.acctA);
  }
}
```

Each saveTaskState activity in the workflow saves the state of the task in association with its task identifier and is performed synchronously (e.g., is a blocking function call) that waits for the saveTaskState call to return before proceeding with the next activity in the workflow. Synchronous calls are necessary in this case because saving the state of the task to the persistent store 280 may fail, in which case the task should not proceed due to the possibility of creating an inconsistent state of the system (e.g., unbalanced accounting books). As such, each saveTaskState to the persistent store 280 adds processing time due to the roundtrip of sending the save messages and receiving a confirmation that the saveTaskState activity succeeded. While Table 2 and FIG. 1A illustrate a simple example, practical workflows may include hundreds of activities, or more, such that saving or syncing the task state after each activity results in significant increases in latency.

As such, some aspects of embodiments of the present disclosure relate to reducing latency by saving the state of the task only when particular conditions are satisfied and omitting or refraining from saving the state of the task when the conditions are not satisfied.

In general, approaches according to some embodiments of the present disclosure relate to restricting workflows to include only non-idempotent read-only activities and idempotent activities (idempotent read-only, idempotent read-write activities, or idempotent write activities) and do not include non-idempotent read-write activities (e.g., workflows according to some embodiments exclude non-idempotent read-write activities). (The example workflows in Tables 1 and 2, presented above, exhibit this property, because each activity is a non-idempotent read-only activity, an idempotent read-only activity, or an idempotent read-write activity.) In addition, the state of the task is saved to persistent store only when the state includes "non-reproducible data" that has not yet been saved to the persistent store and the next activity is an idempotent read-write activity (idempotent write activity) that mutates (modifies) external state (e.g., data outside of the workflow, such as data stored in databases). When these conditions are not satisfied, the processing system 200 refrains from saving the task state (or omits the save of the task state) to the persistent store 280, thereby reducing latency during execution of the workflows in comparison to systems that save the task state after each activity.

Referring back to FIG. 3, at 310 the processing system 200 executes the workflow, such as by supplying the input message to the first activity as an input message to a corresponding service. The corresponding service may then generate one or more messages that are sent to one or more other services 250 and/or consumers 220 in accordance with the activities specified in the workflow.

Figure 4:
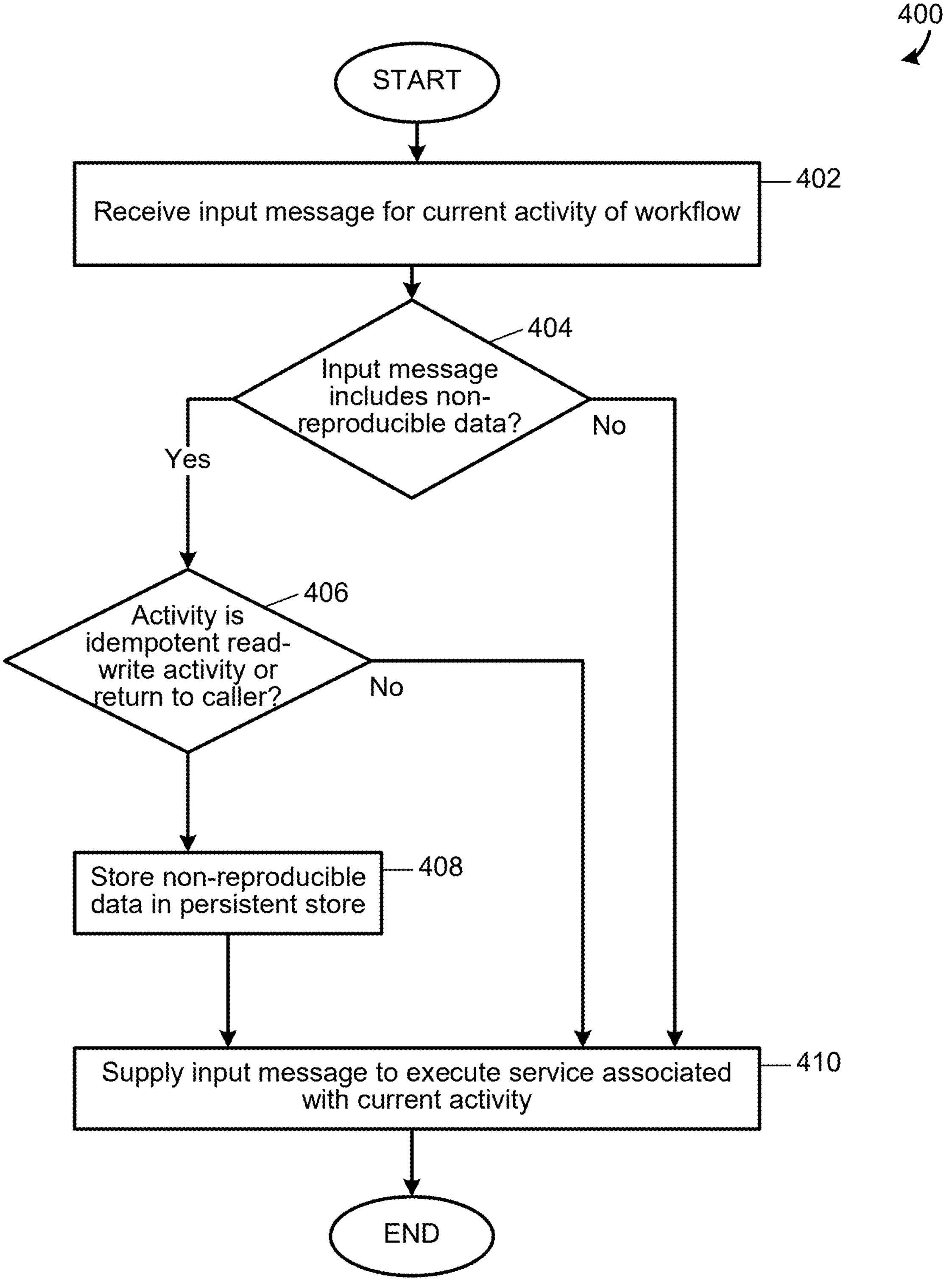
FIG. 4 is a flowchart of a method for saving the state of a task before executing an activity of a workflow according to one embodiment of the present disclosure.

FIG. 4 is a flowchart of a method 400 for saving the state of a task before executing an activity of a workflow according to one embodiment of the present disclosure. In more detail, the processing system 200—such as a centralized workflow coordinator such as the task runner 290, the services 250 performing calls using library functions, or combinations thereof-perform the various steps shown in FIG. 4. For example, when implemented by a centralized workflow coordinator, the workflow coordinator performs the analysis of whether to save the state of the task and saves the data to the persistent store 280 when appropriate before forwarding the message to the execute the next service in the workflow.

When implemented as a library function that wraps around calls to an existing service, input messages to be sent to the existing service are first processed by the wrapper, which performs a determination of whether state should be saved. Table 3, below, presents one example of a library-based implementation where calls to individual services for each activity in the workflow are wrapped and the workflow uses the Saga Pattern for compensating for failures.

TABLE 3

```
TransferResponse transfer(MyRequest request) {
  request = saga.begin(request) ;
  saga.runTask(( ) -> {
    AResp aResp = saga.run(getCurrentTimestamp, request);
    BResp bResp = saga.run(checkBalance, aResp);
    CResp cResp = saga.run(debit, bResp,
                        ( ) -> saga.run(compensateDebit, f(debit)));
    DResp dResp = saga.run(credit, cResp);
    saga.terminate(dResp.bar( ));
    return dResp.bar( );
  });
}
```

When using the Saga Pattern, the processing system 200 maintains a list (or stack) of compensation closures (unexecuted function calls). When a mutating activity (a read-write activity) is called, a corresponding compensating mutating (or read-write) activity is added to the list of compensation closures to undo the corresponding activity. In the event of failure of later activity, the list of closures is executed in order to undo all of the previous successful activities. (There is no need to add a compensation function for the last activity if it is a read-write activity because, if it fails, it did not cause a mutation to be made and if it succeeds, then there is no need to compensate for it.)

In the example shown in Table 3, each call to a service (e.g., "getCurrentTimestamp," "checkBalance," "debit," and "credit") is wrapped in a call to a library function (shown as "saga.run").

In addition to managing the stack of compensation closures, the saga object maintains the execution state of the task in persistent store. The saga.begin method uses an idempotency key in the request to query for a pre-existing task record in the persistent store 280. If the task record contains state for an activity, saga.run restores the activity's state prior to running the activity. Thus, any previously terminated activity can return its original response, e.g., as retrieved from the persistent store 280. The saga.run method also selectively checkpoints the task record depending on the idempotence and mutation properties of the activity and whether the saga has non-reproducible data, as described below with respect to FIG. 4. If supplied with a compensation closure, saga.run pushes it onto the stack. The saga.runTask method wraps the body of the task with a try-catch handler that persists the final response, and if an error occurs, invokes a saga.compensate method to run the compensation closures.

Referring to FIG. 4, before executing a particular activity of a workflow, the processing system 200 receives the input message (input arguments) for the activity at 402. The current activity may be, for example, the activity that was provided as an argument to the saga.run wrapper, and the input message may be all of the other input arguments provided to the saga.run wrapper. At 404, the processing system 200 determines whether the input message includes non-reproducible data. In some embodiments, the input messages include a non-reproducible data flag (e.g., a Boolean value) or a "dirty" flag that indicates whether the message includes non-reproducible data, and therefore the processing system 200 determines whether the input message includes non-reproducible data based on whether the non-reproducible data flag is set (e.g., whether the data is "dirty" or "clean").

In response to determining that the message does include non-reproducible data, at 406 the processing system 200 determines whether the current activity to be executed is an idempotent read-only activity or a return of a value to the caller of the workflow (e.g., the caller computing device that generated the initial input message). If so, then at 408 the processing system 200 stores the non-reproducible data in the persistent store 280 in association with the task identifier of the current task. The stored non-reproducible data may include, for example, the input message for the current activity of the workflow (e.g., the arguments of a current remote procedure call associated with the activity) and any previously unsaved messages that were supplied as inputs to previous activities in the workflow (including the initial input message received from, for example, a producer 210). The processing system 200 then proceeds with supplying the input message to execute the service associated with the current activity at 410. Records associated with the task (e.g., records matching having the task identifier) may be marked or flagged as "running" while execution of the task is active (e.g., while one or more services is executing activities associated with the task or while messages associated with the task are actively waiting to be processed by one or more services).

In response to determining that the message does not include non-reproducible data at 404, the processing system 200 proceeds with supplying the input message to execute the service associated with the current activity at 410 without storing the data to the persistent store 280. Likewise, in response to determining that the activity is not an idempotent read-write or a return to caller at 406, the processing system 200 proceeds with supplying the input message to execute the service associated with the current activity at 410 without storing the data to the persistent store 280. While FIG. 4 shows two separate conditional steps 404 for determining whether the input message includes non-reproducible data and whether the activity is an idempotent read-write activity or a return to caller, embodiments of the present disclosure are not limited thereto. For example, the conditions may be tested in a different order, may be combined into a single branch with a conditional expression that combines the two requirements with an AND (e.g., requiring both conditions to be true).

The processing system 200 sets (sets to "true") the non-reproducible data flag (or "dirty" flag) associated with data when the data is first received from a source of non-reproducible data (e.g., an initial input message or data received from a non-idempotent activity). When the data is written to the persistent store 280 at 408, the input message is written with the flag is cleared (e.g., set to "false" or otherwise set to indicate that the data is "clean") such that a subsequent read of the data from persistent store 280 indicates that it is reproducible data ("clean" data).

While FIG. 4 depicts one embodiment of the present disclosure where the processing system 200 determines at runtime (e.g., during execution of the workflow) whether a particular message contains non-reproducible data, embodiments of the present disclosure are not limited thereto. For example, in some embodiments, static analysis is performed, for example, by a software compiler at compile time to analyze the program flow. For example, non-idempotent read-only activities, idempotent read-only activities, and idempotent read-write activities may have different types or implement different interfaces. Accordingly, the compiler or static analyzer automatically determines which activities in a workflow generate non-reproducible data (e.g., based on the data being the initial input message or based on the data being a return value from a non-idempotent read activity) and the compiler or a code generator automatically inserts checkpointing writes to the persistent store into the compiled or generated code when the above conditions are met (where the message contains non-reproducible data and the next activity is a call to an idempotent read-write or a return to the caller) as determined by static analysis. In some embodiments, the compiler or static analyzer also enforces the requirement that all activities within a workflow are non-idempotent read-only activities, idempotent read-only activities, and idempotent read-write activities (e.g., that none of the activities are non-idempotent read-write activities). In some embodiments, the compiler or code generator further generates code that omits a write to the persistent store in a case where data that would otherwise be assumed to include non-reproducible data was retrieved from the persistent store 280.

As such, aspects of embodiments of the present disclosure provide systems and methods for reducing latency in a workflow orchestration system by saving checkpoints that store the state of the execution of a workflow (a task) only under particular conditions, thereby avoiding the latency cost associated with unnecessary synchronous writes to a persistent store or task database. As will be described in more detail below, by constraining the possible activities to non-idempotent read-only activities, idempotent read-only activities, and idempotent read-write activities (and excluding non-idempotent read-write activities), processing systems 200 according to embodiments of the present disclosure successfully recover from failures in the execution of workflows (or tasks), even with the reduced number of checkpoints.

When a task successfully completes and the value is successfully returned to the caller computing device, a cleanup operation may be performed on the persistent store 280 (the task database) to remove all of the checkpoints associated with the particular task (based on the task identifier of the successfully completed task) or to mark all records associated with the task identifier with a status of "completed" or "completed task."

When a task fails, such as due to the process crash of an underlying service of the workflow and due to the failure of any and all retries, records associated with the task in the persistent store 280 may be marked with a status of "suspended" or "suspended task." A failed task has its execution paused and may be resumed at a later time by the task runner 290, as described in more detail below.

In some embodiments of the present disclosure, a workflow specifies that, in the event of a task failure, the task returns a speculative response to the caller computing device. The speculative response may include the return value that the task is expected to produce, and may also support asynchronous completion of the task after resumption of the task (as described below), where the completion of the task may confirm the original speculative response or may return a value different from the speculative response. A speculative response is useful in circumstances where the task is likely to succeed, but may be blocked by a temporary service outage, and where a fast return to the caller computing device is prioritized over strictly maintaining system invariants (e.g., strictly maintaining accuracy and data consistency at all times).

In addition, some aspects of embodiments relate to setting a breakpoint on a workflow. The workflow may include a breakpoint that is set on the workflow as a whole and/or on one or more particular activities in the workflow. When one or more breakpoint conditions are satisfied, then the records associated with the task in the persistent store 280 are flagged as "at-breakpoint" (or equivalent) and execution of the task is paused. Examples of breakpoint conditions include reaching a maximum number of retries or a maximum number of attempted resumptions from a "suspended task" status by the task runner, as described in more detail below.

To survive process crashes and to support long back-off periods between retries (as discussed in more detail below), some aspects of embodiments relate to implementing an agent to query the persistent store 280 for task records of tasks that are not currently running.

Figure 5:
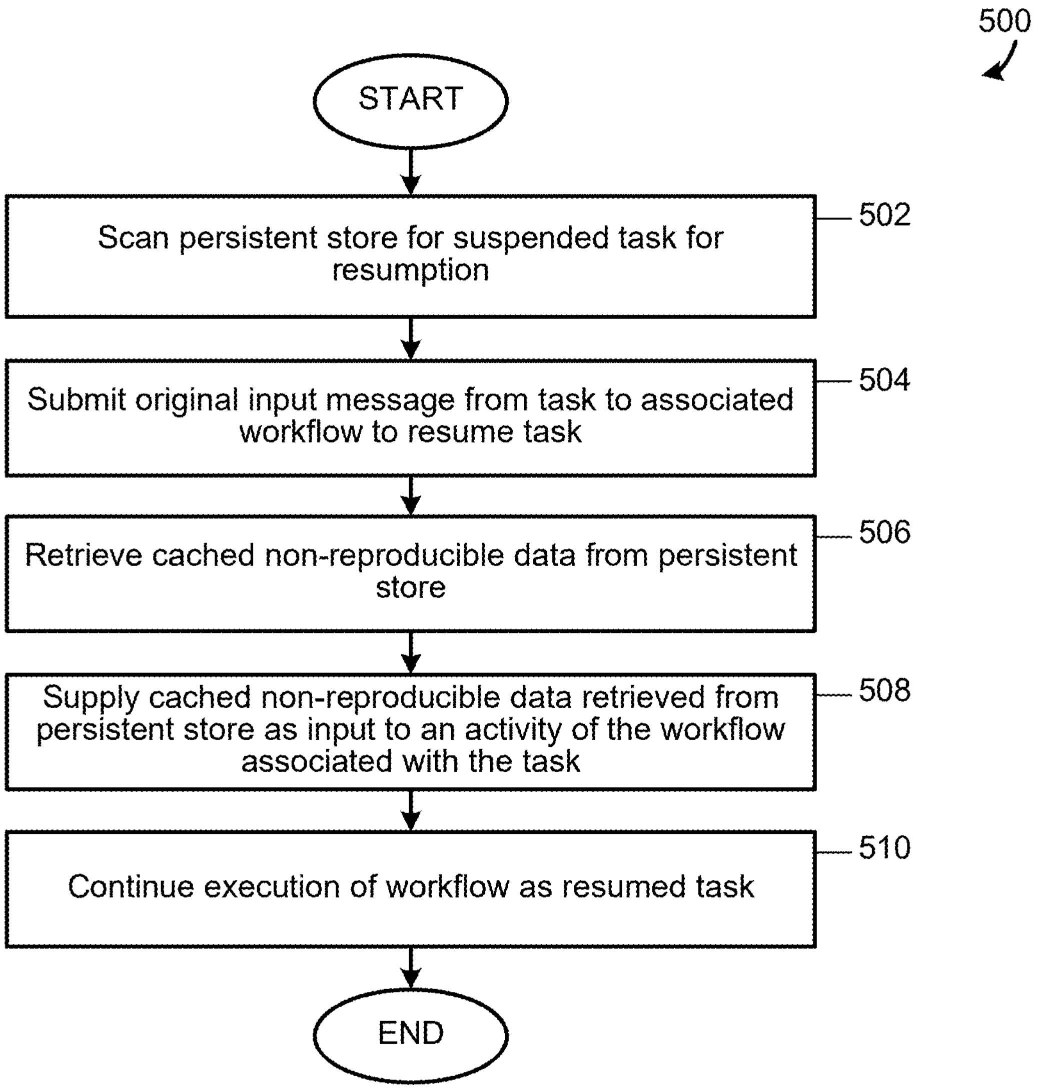
FIG. 5 is a flowchart of a method for resuming a suspended task according to one embodiment of the present disclosure.
Figure 6:
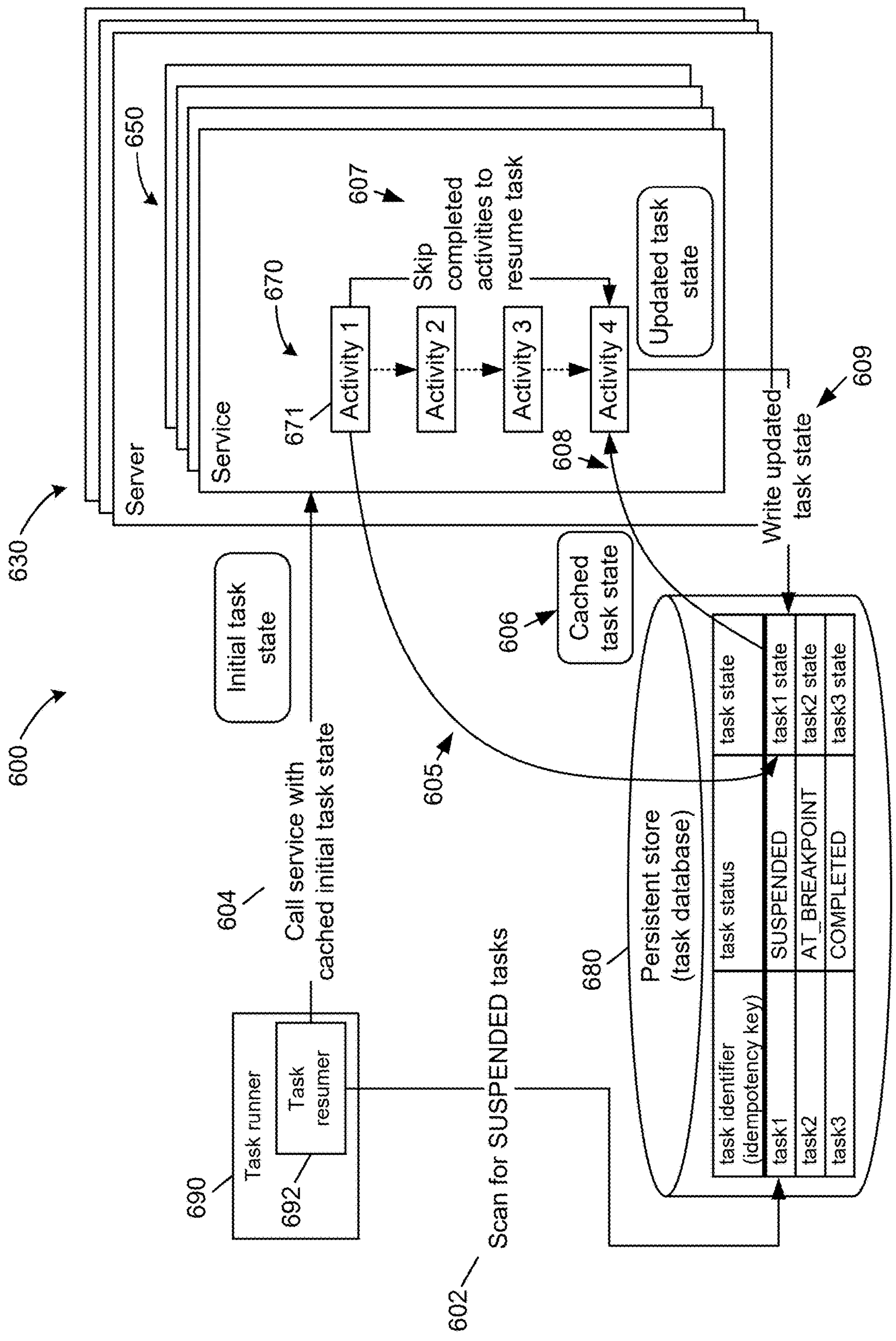
FIG. 6 is a schematic depiction of a processing system including a task resumer configured to resume a paused task in a persistent store according to one embodiment of the present disclosure.

FIG. 5 is a flowchart of a method 500 for resuming a paused task according to one embodiment of the present disclosure. FIG. 6 is a schematic depiction of a processing system 600 including a task resumer 692 of a task runner 690 configured to resume a paused task in a persistent store according 680 to one embodiment of the present disclosure.

Referring to FIG. 6, a processing system 600 according to some embodiments includes a task runner 690 that includes a task resumer 692 that is configured to resume paused tasks in order to eventually eliminate or resolve inconsistencies caused by partially-completed tasks, including tasks that returned speculative responses to their callers. The task resumer 692 may be implemented by program instructions stored in memory that, when executed by a processor, cause the processor to perform operations to manage the resumption of paused tasks.

The task resumer 692 is configured to periodically query or scan the persistent store 280 (at 502 of FIG. 5 and at 602 of FIG. 6) for tasks that are paused and ready to be resumed (e.g., ready to run). These paused tasks may include, for example, tasks that are flagged as "suspended," "at-breakpoint," or equivalents thereof. FIG. 6 shows a persistent store 680 and three rows of a task database, reproduced below as Table 4, showing three tasks in having different statuses:

TABLE 4

| task identifier (idempotency key) | task status | task state |
|---|---|---|
| task1 | SUSPENDED | task1 state |
| task2 | AT_BREAKPOINT | task2 state |
| task3 | COMPLETED | task3 state |

As shown in Table 4, the persistent store 680 stores a status of each task along with the task state. The task status indicates an execution status of the task, such as whether a task is running, suspended, at a breakpoint, or completed. The task state includes the non-reproducible data associated with the task (e.g., the initial input message, non-reproducible data generated during an execution of the task, and the like) that was stored during execution of the task (e.g., at 408 of the method shown in FIG. 4).

In some embodiments, the task resumer 692 automatically resumes paused tasks that are "suspended," but requires manual intervention (e.g., explicit input from a user) before resuming a task that is paused with the "at-breakpoint task" status. In some embodiments, the task resumer 692 tracks the number of times a failed task has been resumed (e.g., stored in the persistent store 680), and does not resume tasks after a maximum number of attempted re-runs. In some embodiments, the persistent store 680 stores a "ready-after" time that that the task cannot be resumed until after the "ready-after" timestamp. The "ready-after" time may be used, in some embodiments, to implement backoff timers that schedule a minimum amount of time that must elapse before the task can be resumed (e.g., a linear backoff or capped exponential backoff).

In some embodiments, the task resumer 692 includes a priority queue, per service 250, of paused tasks sorted by ready time (or "ready-after" time). In some embodiments, the queue size is capped to reduce the likelihood of memory exhaustion. A background thread blocks on the priority queue until the first task was ready to resume, then feeds the first task to the corresponding workflow. These embodiments may reduce the latency of resuming tasks because tasks are resumed as soon as they were ready, rather than at the time of the next periodic query by the task resumer 692.

After selecting a task to be resumed, the task resumer 692 of the task runner 290 retrieves a copy of the original incoming message stored in the persistent store 280 and, at 504 of FIGS. 5 and 604 of FIG. 6, issues the same remote procedure call (e.g., sends the same message as the original input message) to the workflow associated with the task (e.g., to particular services 650 running on servers 630 of the processing system 600 as specified by the workflow) to resume the task. In some embodiments, optimistic locking is used in the persistent store 680 or task database-if one instance of a server gets a lock exception, it abandons the task execution because it is most likely that the record is locked by another instance that is already further along in the execution of the task.

At the start of task execution, e.g., starting a workflow at 310 of FIG. 3 or resuming a workflow at 504 of FIG. 5, it is unclear whether the incoming message (or incoming remote procedure call) is the first for the given idempotency key or whether the idempotency key has been seen before by the processing system 200, in which case the task is being resumed. Thus, in some embodiments such as the example shown in Table 3 above, a task starts by calling a saga.begin method to query the underlying persistent store 680 for the idempotency key (or task identifier) associated with the task at 605 of FIG. 6. Either the resulting task record is found (indicating that the task is being resumed) or no task record is found and a new task record is created (indicating that this is the first execution of the task).

When resuming, the processing system 600 follows the previously executed code path through activities 670 of the workflow because the non-reproducible data (provided in the input message, generated by a non-idempotent read-only activity, and or deterministically derived from other non-reproducible data) is retrieved by the processing system 600 at 506 of FIGS. 5 and 606 of FIG. 6 from the persistent store 680 (e.g., from the prior execution of the activity of the workflow), rather than repeating the computation by non-idempotent activities (e.g., non-idempotent activity 671) (and thereby possibly generating different results on the resumed retry of the task) and because repeating idempotent read-only activities and idempotent read-write activities will produce the same results each time. In addition, in embodiments of the present disclosure, all non-deterministic code is wrapped in an activity and all code in a workflow that is outside an activity is deterministic. In some embodiments, the results from completed activities during an earlier execution of the task are stored as part of the task state, and therefore their computations are skipped at 607 of FIG. 6 by, instead, providing the stored results from the task state. The cached non-reproducible data retrieved from the persistent store 680 is then supplied as input to an activity in the workflow that is associated with the task at 508 of FIGS. 5 and 608 of FIG. 6, e.g., the idempotent read-write activity or the return to the caller where the task aborted (e.g., failed or was otherwise paused on previous execution). The processing system 200 may then continue execution of the workflow as a resumed task at 510. The resumed workflow may fail at the same activity or a later activity in the workflow, or may eventually succeed and terminate. As the workflow progresses, activities may result in updated task states that are written to the persistent store 680, as shown at 609 of FIG. 6.

In some embodiments, the initial query is omitted and the execution of the workflow proceeds as if the incoming message was seen for the first time. This reduces latency by omitting the initial query of the persistent store 680 (e.g., the query at 605). In such embodiments, when the processing system 600 first attempts to save non-reproducible data to the persistent store 680, it receives an exception or other error from the persistent store 680, indicating that a record already exists for the given task identifier. The processing system 600 may then use this exception or error as an indication that this is a resumption of an existing task and proceeds by retrieving the memoized or cached responses stored in the persistent store 680.

As noted above, some tasks, such as task2 shown in FIG. 6 and Table 4, are paused with an "at-breakpoint task" status, where the task resumer 692 does not automatically resume tasks that are "at-breakpoint" tasks. Instead, according to some embodiments of the present disclosure, tasks that are "at-breakpoint tasks" await manual resumption, such as by an engineer or other user. Pausing a task at a breakpoint is useful when input from technical operations personnel (e.g., engineers) is needed to resolve a failing workflow and when technical operations personnel are investigating the underlying causes of failures of workflows. Accordingly, some aspects of embodiments relate to providing a user interface (e.g., an interface displayed via a web page) to allow a user to view a list of all paused tasks in the persistent store and/or all tasks with the "at-breakpoint task" status and provide a view of the contents of the task state stored in the persistent store 680. For example, the task state may be stored in a structured data format such as JavaScript Object Notation (JSON), WebPack, ProtoBuf, or Extensible Markup Language (XML), and the user interface is configured to display the task state. In addition, technical operations personnel may modify the task state stored in the persistent store 680 and/or resubmit messages to particular services in order to resolve failures or other problems associated with particular tasks, such as to resolve inconsistencies caused by failures in the system that could not be otherwise compensated.

Figure 7:
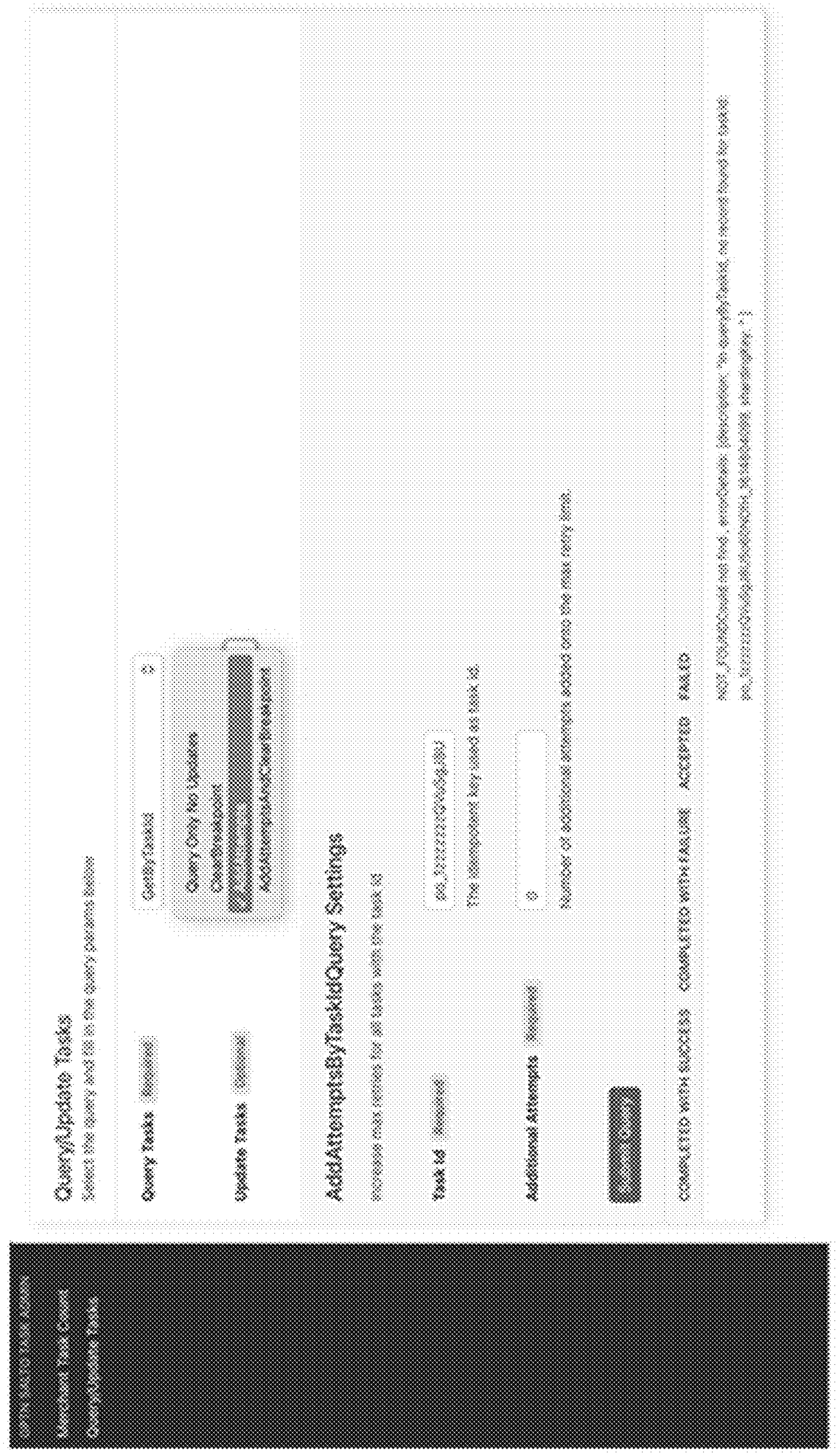
FIG. 7 is a screenshot of a user interface for controlling tasks that have a status of "at-breakpoint" according to one embodiment of the present disclosure.

FIG. 7 is a screenshot of a user interface for controlling tasks that have a status of "at-breakpoint task" according to one embodiment of the present disclosure. In some embodiments, the user interface provides a mechanism to control the resumption of a task having an "at-breakpoint task" status by changing the status of the task to "suspended task" so that the task resumer 692 automatically resumes the task (e.g., at the next scan of the suspended tasks). Resuming the at-breakpoint task rolls the task forward such as by adding more retries to the failed activity in order to continue the workflow. In some embodiments, the user interface provides a mechanism to clear the breakpoint and "roll back" a task having an "at-breakpoint" status. Clearing the breakpoint triggers the compensation logic associated with the task (e.g., the stack of compensation closures), thereby rolling back any changes made by the successful activities of the task.

As discussed above, when resuming a task, previously-computed non-reproducible data is retrieved from the persistent store 680 and supplied as input to one or more activities. However, some forms of non-reproducible data produced by non-idempotent read-only activities may be perishable or may otherwise have limited useful lifetimes. Therefore, in some embodiments, some non-idempotent read operations place an expiration time on their responses. For example, a policy service that checks whether a particular action is allowed might require the approval to expire after two hours. However, in some circumstances, the retries performed by the processing system 600 may occur over an extended period of time such that some or all of the non-reproducible data cached in the persistent store 680 may be expired at the time of a retry or resumption of a suspended task.

In some embodiments, a task is associated with a deadline. The initial value of the deadline may be supplied by the caller computing device such as by including the deadline in the initial input message, and where the absence of a deadline may be used to indicate that there is no deadline on the task. In some embodiments, an activity can optionally tighten this deadline (e.g., set a deadline closer to the current time), such as in the case of a non-idempotent read-only activity that returns a result with an expiration time that is sooner than the deadline. When the processing system 600 detects that a currently executed task has failed to meet its deadline (e.g., the task is not yet completed and the current time is after the deadline of the task), then the processing system 600 will immediately fail the task (e.g., with a DEADLINE_EXCEEDED failure). In addition, exceeding a deadline is a non-retryable failure because a later retry would merely be ever later after the deadline, and therefore, in some embodiments the processing system 600 executes the compensation workflow (e.g., the stack of compensating closures) to compensate for the changes that were made by the successful activities in the workflow.

In some embodiments, the client computing device or caller computing device (e.g., a producer 210) may retry, but would generate a new idempotency key (e.g., start an entirely new task).

As such, aspects of embodiments of the present disclosure relate to systems and methods for orchestrating workflows in which the execution state of a workflow (a task state) is saved to a persistent store such that the can be retried or paused and resumed in the case of failure. Some aspects of embodiments of the present disclosure relate to saving the state of a task selectively based on satisfying particular conditions in the workflow, thereby reducing the amount of latency added by synchronous writes to the persistent store.

In some embodiments, the workflow includes only non-idempotent read-only activities, idempotent read-only activities, and non-idempotent read-write activities (or idempotent write activities) and excludes non-idempotent read-write activities. In such embodiments, the state of the task (a checkpoint) is saved to persistent store only when the input message to an activity includes non-reproducible data and the next activity to be performed is an idempotent read-write or a return to the caller of the workflow. Non-reproducible data includes the input arguments to the task (e.g., as supplied by the caller of the workflow) and data generated by the non-idempotent read-only activities of the workflow.

When resuming a suspended task, the processing system retrieves the state of the task from the persistent store and replays the responses from the non-idempotent read only activities of the workflow. In some embodiments, idempotent read-only and idempotent read-write activities are repeated without ill effect because they are idempotent (e.g., idempotent read-only activities generate the same responses as during previous executions of the task and idempotent read-write activities do not modify writes that have previously succeeded). These repeated idempotent activities may cause some redundant computation, but only in the case of retries and is a tradeoff for omitting saving the state of the task during execution. When failure rates are relatively low, the cost of repeated computations on retries is outweighed by the reduction in latency by omitting the saving of unnecessary checkpoints during the typical correct execution path.

As such, aspects of embodiments of the present disclosure relate to techniques for the low latency and reliable orchestration of workflows.

Processing Circuits of Computing Devices

Figure 8:
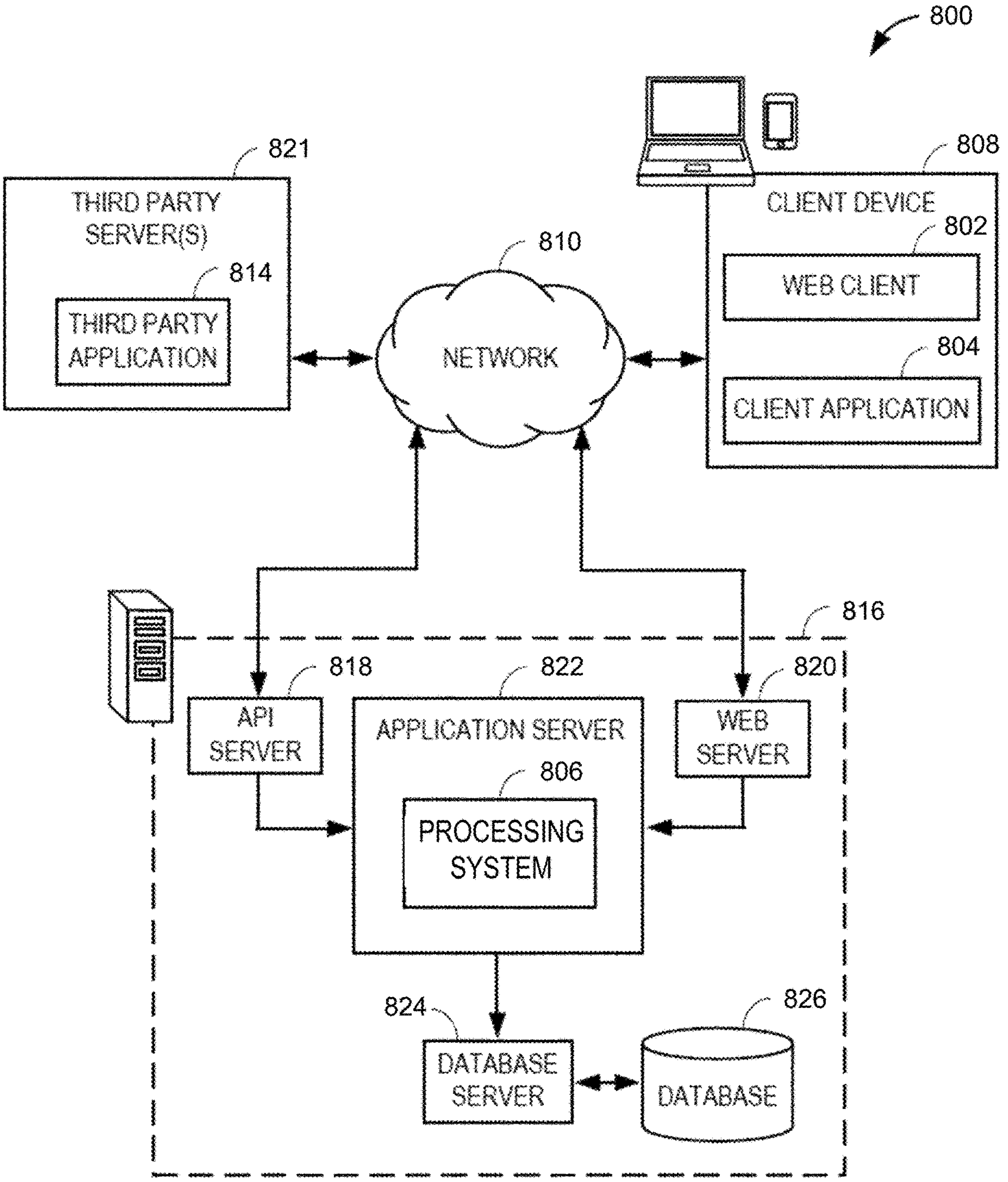
FIG. 8 is a block diagram illustrating a high-level network architecture of a computing system environment for operating a processing system according to embodiments of the present disclosure.

With reference to FIG. 8, an example embodiment of a high-level SaaS network architecture 800 is shown. A networked system 816 provides server-side functionality via a network 810 (e.g., the Internet or a WAN) to a client device 808. A web client 102 and a programmatic client, in the example form of a client application 104, are hosted and execute on the client device 108. The networked system 816 includes one or more servers 822 (e.g., servers hosting services exposing remote procedure call APIs), which hosts a processing system 806 (such as the processing system described above according to various embodiments of the present disclosure) that provides a number of functions and services via a service oriented architecture (SOA) and that exposing services to the client application 804 that accesses the networked system 816 where the services may correspond to particular workflows. The client application 804 also provides a number of interfaces described herein, which can present an output in accordance with the methods described herein to a user of the client device 808.

The client device 808 enables a user to access and interact with the networked system 816 and, ultimately, the processing system 806. For instance, the user provides input (e.g., touch screen input or alphanumeric input) to the client device 808, and the input is communicated to the networked system 816 via the network 810. In this instance, the networked system 816, in response to receiving the input from the user, communicates information back to the client device 808 via the network 810 to be presented to the user.

An API server 818 and a web server 820 are coupled, and provide programmatic and web interfaces respectively, to the servers 822. For example, the API server 818 and the web server 820 may produce messages (e.g., RPC calls) in response to inputs received via the network, where the messages are supplied as input messages to workflows orchestrated by the processing system 806. The API server 818 and the web server 820 may also receive return values (return messages) from the processing system 806 and return results to calling parties (e.g., web clients 802 and client applications 804 running on client devices 808 and third-party applications 814) via the network 810. The servers 822 host the processing system 806, which includes components or applications in accordance with embodiments of the present disclosure as described above. The servers 822 are, in turn, shown to be coupled to one or more database servers 824 that facilitate access to information storage repositories (e.g., databases 826). In an example embodiment, the databases 826 includes storage devices that store information accessed and generated by the processing system 806, such as the persistent store 280 of FIG. 2 and the persistent store 680 of FIG. 6 and other databases such as databases storing information written to by idempotent read-write activities and read from by idempotent read-only activities and, in some cases, non-idempotent read-only activities.

Additionally, a third-party application 814, executing on one or more third-party servers 821, is shown as having programmatic access to the networked system 816 via the programmatic interface provided by the API server 818. For example, the third-party application 814, using information retrieved from the networked system 816, may support one or more features or functions on a website hosted by a third party. For example, the third-party application 814 may serve as a producer 210 and/or a consumer 220 of messages processed by the processing system 806, and may also be accessed by non-idempotent read-only activities, idempotent read-only activities, and idempotent read-write activities of workflows handled by the processing system 806.

Turning now specifically to the applications hosted by the client device 808, the web client 802 may access the various systems (e.g., the processing system 806) via the web interface supported by the web server 820. Similarly, the client application 804 (e.g., an "app" such as a payment processor app) may access the various services and functions provided by the processing system 806 via the programmatic interface provided by the API server 818. The client application 804 may be, for example, an "app" executing on the client device 808, such as an iOS or Android OS application to enable a user to access and input data on the networked system 816 in an offline manner and to perform batch-mode communications between the client application 804 and the networked system 816.

Further, while the network architecture 800 shown in FIG. 8 employs a client-server architecture, the present disclosure is not limited to such an architecture, and could equally well find application in a distributed, or peer-to-peer, architecture system, for example.

Figure 9:
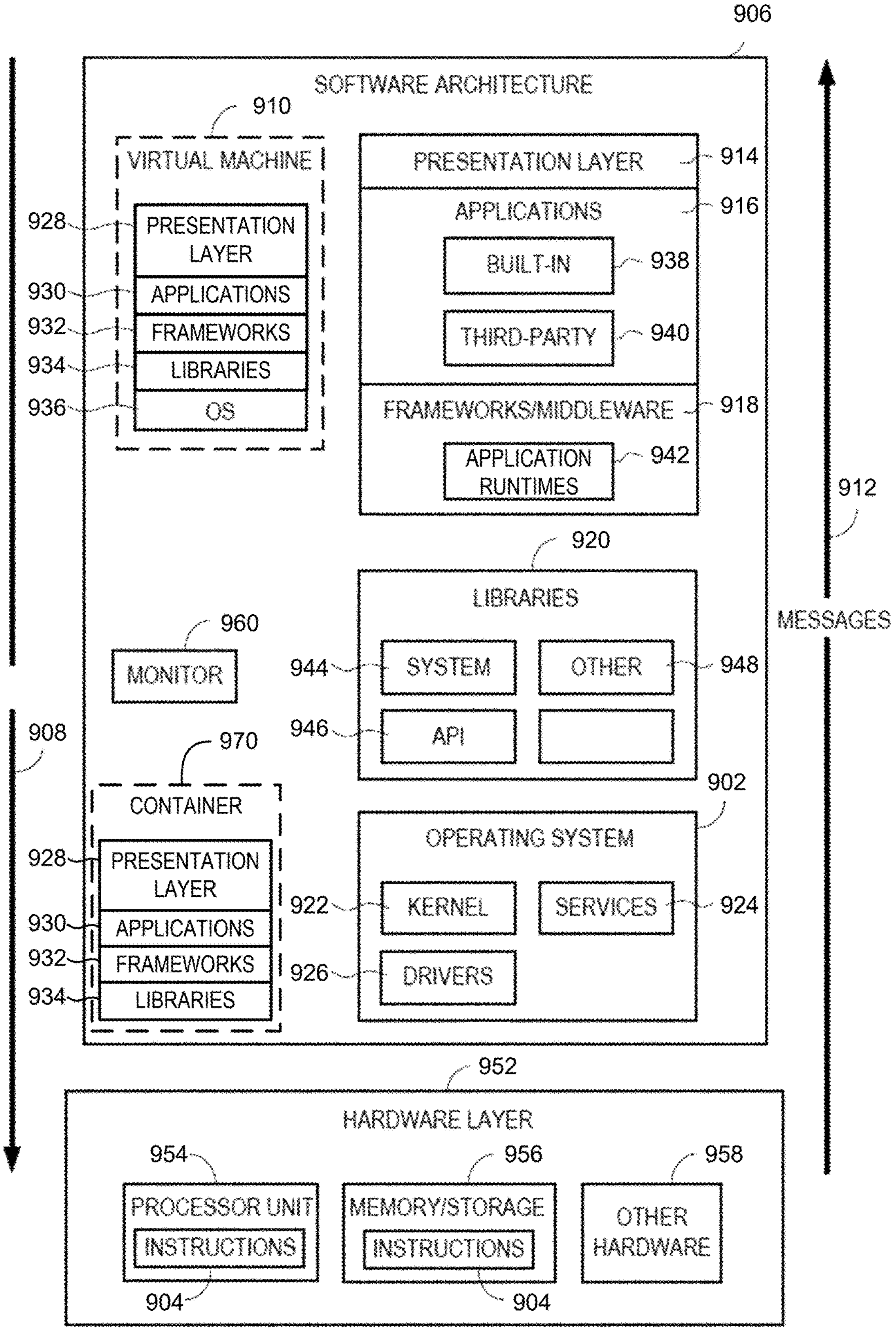
FIG. 9 is a block diagram illustrating a representative software architecture, which may be used in conjunction with various hardware architectures as described herein.

FIG. 9 is a block diagram illustrating an example software architecture 306, which may be used in conjunction with various hardware architectures herein described. FIG. 9 is a non-limiting example of a software architecture 906, and it will be appreciated that many other architectures may be implemented to facilitate the functionality described herein. The software architecture 906 may execute on hardware such as a machine 1000 of FIG. 10 that includes, among other things, processors 1004, memory/storage 1006, and input/output (I/O) components 1018. A representative hardware layer 952 is illustrated and can represent, for example, the machine 1000 of FIG. 10. The representative hardware layer 952 includes a processor 954 having associated executable instructions 904. The executable instructions 904 represent the executable instructions of the software architecture 906, including implementation of the methods, components, and so forth described herein. The hardware layer 952 also includes non-transitory memory and/or storage modules as memory/storage 956, which also have the executable instructions 904. The hardware layer 952 may also include other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916 (such as the services of the processing system), and a presentation layer 914. Operationally, the applications 916 and/or other components within the layers may invoke API calls 908 through the software stack and receive a response as messages 912 in response to the API calls 908. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide high-level resource management functions, web application frameworks, application runtimes 942 (e.g., a Java virtual machine or JVM), and so forth. The frameworks/middleware 918 may provide a broad spectrum of other APIs that may be utilized by the applications 916 and/or other software components/modules, some of which may be specific to a particular operating system or platform.

The applications 916 include built-in applications 938 and/or third-party applications 940. The applications 916 may use built-in operating system functions (e.g., kernel 922, services 924, and/or drivers 926), libraries 920, and frameworks/middleware 918 to create user interfaces to interact with users of the system. Alternatively, or additionally, in some systems, interactions with a user may occur through a presentation layer, such as the presentation layer 914. In these systems, the application/component "logic" can be separated from the aspects of the application/component that interact with a user.

Some software architectures use virtual machines. In the example of FIG. 9, this is illustrated by a virtual machine 910. The virtual machine 910 creates a software environment where applications/components can execute as if they were executing on a hardware machine (such as the machine 1000 of FIG. 10, for example). The virtual machine 910 is hosted by a host operating system (e.g., the operating system 902 in FIG. 9) and typically, although not always, has a virtual machine monitor 960 (or hypervisor), which manages the operation of the virtual machine 910 as well as the interface with the host operating system (e.g., the operating system 902). A software architecture executes within the virtual machine 910 such as an operating system (OS) 936, libraries 934, frameworks 932, applications 930, and/or a presentation layer 928. These layers of software architecture executing within the virtual machine 910 can be the same as corresponding layers previously described or may be different.

Some software architectures use containers 970 or containerization to isolate applications. The phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node. A container 970 is similar to a virtual machine in that it includes a software architecture including libraries 934, frameworks 932, applications 930, and/or a presentation layer 928, but omits an operating system and, instead, communicates with the underlying host operating system 902.

Figure 10:
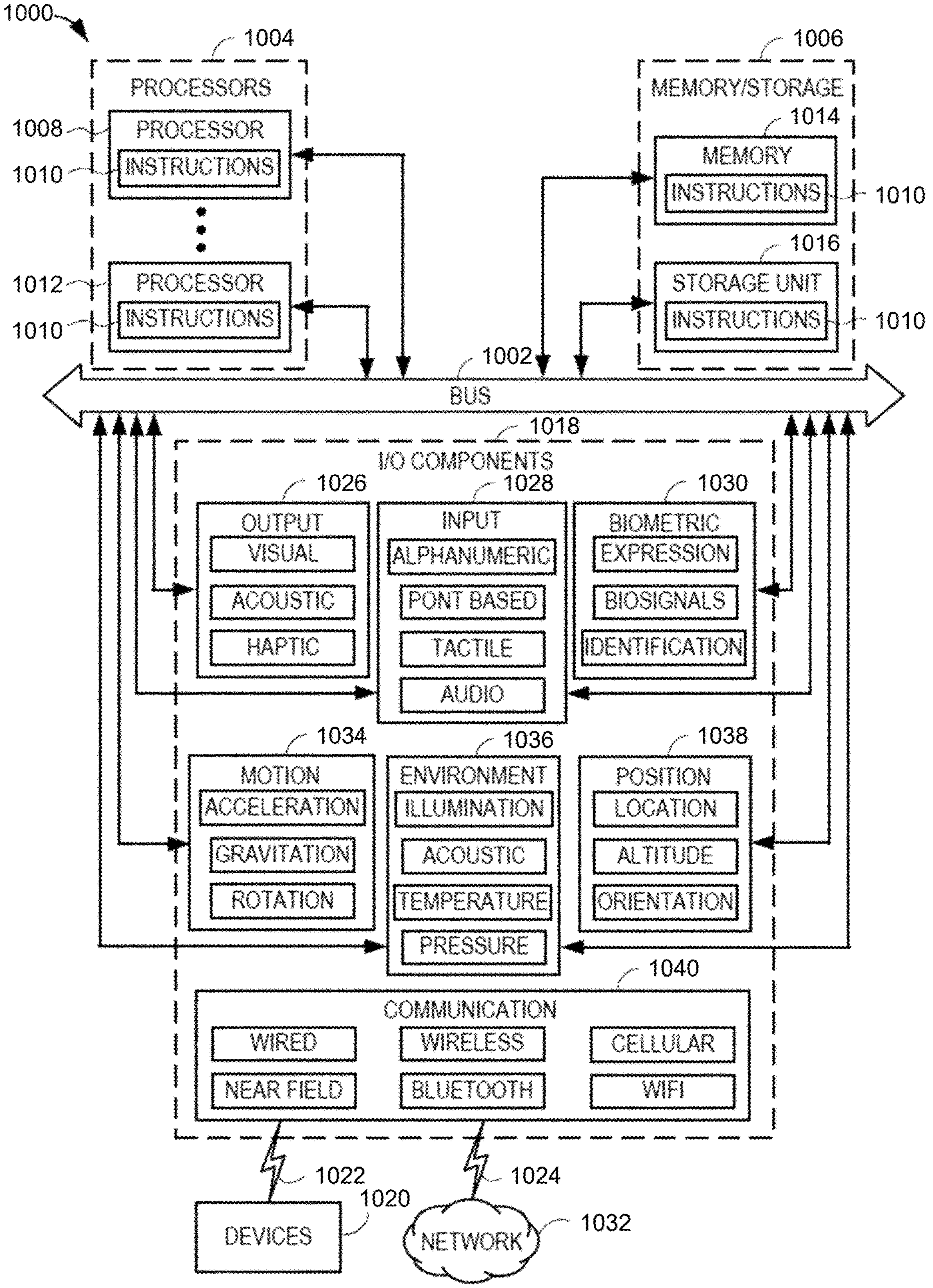
FIG. 10 is a block diagram illustrating components of a processing circuit or a processor, according to some example embodiments, configured to read instructions from a non-transitory computer-readable medium (e.g., a non-transitory machine-readable storage medium) and perform any one or more of the methods discussed herein.

FIG. 10 is a block diagram illustrating components of a machine 1000, according to some example embodiments, able to read instructions from a non-transitory machine-readable medium (e.g., a computer-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or in parallel or concurrently, that specify actions to be taken by the machine 1000. Further, while only a single machine 1000 is illustrated, the term "machine" or "processing circuit" shall also be taken to include a collection of machines that individually or jointly execute the instructions 1010 to perform any one or more of the methodologies discussed herein.

The machine 1000 may include processors 1004 (including processors 1008 and 1012), memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for processing workflows, comprising:

receiving an initial input message from a caller computing device to a processing system comprising one or more processors and memories storing instructions that, when executed, cause the one or more processors to execute a plurality of services configured to receive input messages and to generate output messages in response to the input message and a persistent store;

identifying, by the processing system, a workflow associated with the initial input message, the workflow comprising a plurality of activities, each activity being separately classified as an idempotent read-write activity, an idempotent read-only activity, or a non-idempotent read-only activity associated with a corresponding one of the plurality of services; and executing, by the processing system, the workflow as a task by supplying the initial input message to the workflow and, for each activity in the workflow:

determining, by the processing system, whether an input message to the activity comprises non-reproducible data;

in response to determining that an input message to the activity comprises non-reproducible data, storing, by the processing system, the non-reproducible data in the persistent store of the processing system only if the input message comprises non-reproducible data and the activity is a read-write activity or a return to the caller; and providing, by the processing system, the input message to a service corresponding to the activity to execute the activity of the workflow.

2. The method of claim 1, wherein the input message comprises a non-reproducible data flag indicating whether the input message comprises non-reproducible data, and wherein the determining whether the input message to the activity comprises non-reproducible data comprises determining whether the non-reproducible data flag is set.

3. The method of claim 2, wherein the storing the non-reproducible data in the persistent store of the processing system comprises writing the input message to the persistent store with the non-reproducible data flag cleared.

4. The method of claim 1, further comprising, in response to determining a failure of the activity of the workflow:

setting a status of the task in the persistent store as a suspended task; and pausing execution of the task.

5. The method of claim 1, further comprising:

scanning the persistent store to identify a suspended task;

retrieving an original initial input message of the suspended task from the persistent store; and submitting the original initial input message of the suspended task to a workflow associated with the suspended task to resume the suspended task.

6. The method of claim 5, further comprising:

retrieving, from the persistent store, cached non-reproducible data associated with the suspended task; and supplying the cached non-reproducible data as input to an activity of the workflow associated with the suspended task.

7. The method of claim 5, wherein the suspended task is associated with a ready-after time, and wherein the processing system is configured to submit the original input message of the suspended task to the workflow associated with the suspended task to resume the suspended task only after the ready-after time associated with the suspended task.

8. The method of claim 1, wherein the workflow comprises a breakpoint, and wherein the method further comprises:

determining whether one or more breakpoint conditions associated with the breakpoint are satisfied; and in response to determining that the one or more breakpoint conditions are satisfied:

setting a status of the task in the persistent store as an at-breakpoint task; and pausing execution of the task.

9. The method of claim 8, further comprising:

identifying one or more tasks having a status in the persistent store as an at-breakpoint task;

receiving a command to resume the task;

in response to receiving a command to resume the task, setting the status of the at-breakpoint task as a suspended task; and resuming execution of the suspended task.

10. The method of claim 1, wherein the task is associated with a deadline, and wherein the method further comprises:

determining that a non-idempotent read-only activity of the workflow returned non-reproducible data having an expiration time earlier than the deadline; and updating the deadline associated with the task based on the expiration time of the non-reproducible data.

11. A processing system comprising:

one or more processing circuits comprising one or more processors and one or more memories storing instructions that, when executed by the one or more processors, cause the one or more processing circuits to execute:

a persistent store configured to store data and retrieve data; and a task runner configured to:

receive an initial input message from a caller computing device;

identify a workflow associated with the initial input message, the workflow comprising a plurality of activities, each activity being an idempotent read-write activity, an idempotent read-only activity, or a non-idempotent read-only activity associated with a corresponding one of a plurality of services implemented by program instructions stored in the one or more memories and executed by the one or more processors of the one or more processing circuits; and supply the initial input message to the workflow to execute the workflow as a task, the one or more memories further storing instructions that, when executed by the one or more processing circuits, cause the processing system to, for each activity in the workflow:

determine whether an input message to the activity comprises non-reproducible data;

in response to determining that an input message to the activity comprises non-reproducible data, store the non-reproducible data in the persistent store only if the input message comprises non-reproducible data and the activity is a read-write activity or a return to the caller; and provide the input message to a service corresponding to the activity to execute the activity of the workflow.

12. The processing system of claim 11, wherein the input message comprises a non-reproducible data flag indicating whether the input message comprises non-reproducible data, and wherein the instructions to determine whether the input message to the activity comprises non-reproducible data comprises instructions to determine whether the non-reproducible data flag is set.

13. The processing system of claim 12, wherein the instructions to store the non-reproducible data in the persistent store of the processing system comprises instructions to write the input message to the persistent store with the non-reproducible data flag cleared.

14. The processing system of claim 11, wherein the one or more memories further store instructions that, when executed by the one or more processors, cause the one or more processors to, in response to determining a failure of the activity of the workflow:

set a status of the task in the persistent store as a suspended task; and pause execution of the task.

15. The processing system of claim 11, wherein the one or more memories further store instructions that, when executed by the one or more processors, cause the task runner executed by the one or more processors to:

scan the persistent store to identify a suspended task;

retrieve a cached initial input message of the suspended task from the persistent store; and submit the cached initial input message of the suspended task to a workflow associated with the suspended task to resume the suspended task.

16. The processing system of claim 15, wherein the one or more memories further store instructions that, when executed by the one or more processors, cause the one or more processors to:

retrieve, from the persistent store, cached non-reproducible data associated with the suspended task; and supply the cached non-reproducible data as input to an activity of the workflow associated with the suspended task.

17. The processing system of claim 15, wherein the suspended task is associated with a ready-after time, and wherein the one or more memories further store instructions that, when executed by the one or more processors, cause the one or more processors to submit the original input message of the suspended task to the workflow associated with the suspended task to resume the suspended task only after the ready-after time associated with the suspended task.

18. The processing system of claim 11, wherein the workflow comprises a breakpoint, and wherein the one or more memories further store instructions that, when executed by the one or more processors, cause the one or more processors to:

determine whether one or more breakpoint conditions associated with the breakpoint are satisfied; and in response to determining that the one or more breakpoint conditions are satisfied:

set a status of the task in the persistent store as an at-breakpoint task; and pause execution of the task.

19. The processing system of claim 18, wherein the one or more memories further store instructions that, when executed by the one or more processors, cause the one or more processors to:

identify one or more tasks having a status in the persistent store as an at-breakpoint task;

receive a command to resume the task;

in response to receiving a command to resume the task, set the status of the at-breakpoint task as a suspended task; and resume execution of the suspended task.

20. The processing system of claim 11, wherein the task is associated with a deadline, and wherein the one or more memories further store instructions that, when executed by the one or more processors, cause the one or more processors to:

determine that a non-idempotent read-only activity of the workflow returned non-reproducible data having an expiration time earlier than the deadline; and update the deadline associated with the task based on the expiration time of the non-reproducible data.

* * * * *